United States Patent
Kwon et al.

(10) Patent No.: US 7,740,275 B2
(45) Date of Patent: Jun. 22, 2010

(54) AIR BAG CUSHION

(75) Inventors: Hae Wook Kwon, Gyeonggi-do (KR); Young Duk Seo, Gyeonggi-do (KR)

(73) Assignee: Hyundai Mobis Co., Ltd, Gyeonggi-Do (KR)

( * ) Notice: Subject to any disclaimer, the term of this patent is extended or adjusted under 35 U.S.C. 154(b) by 163 days.

(21) Appl. No.: 12/026,910

(22) Filed: Feb. 6, 2008

(65) Prior Publication Data

US 2009/0108569 A1 Apr. 30, 2009

(30) Foreign Application Priority Data

Oct. 24, 2007 (KR) .................... 10-2007-0107219

(51) Int. Cl.
*B60R 21/16* (2006.01)
(52) U.S. Cl. .................................... 280/743.1
(58) Field of Classification Search .......... 280/743.1, 280/743.2, 740
See application file for complete search history.

(56) References Cited

U.S. PATENT DOCUMENTS

| 7,128,337 B2 | 10/2006 | Kwon |
| 2006/0049618 A1* | 3/2006 | Bito .......................... 280/732 |
| 2007/0296186 A1 | 12/2007 | Kwon |
| 2008/0023943 A1 | 1/2008 | Kwon |

* cited by examiner

*Primary Examiner*—Faye M. Fleming
(74) *Attorney, Agent, or Firm*—Greenblum & Bernstein P.L.C.

(57) ABSTRACT

An airbag cushion is configured to be deployed by an introduced gas to provide a predetermined space therein, wherein a valley is configured to be formed at a center region which a passenger's face impacts when the airbag cushion is deployed. The airbag cushion includes a front panel, a rear panel provided rearward of the front panel, wherein the front panel and the rear panel are joined together and thus form the predetermined space when gas is introduced.

5 Claims, 8 Drawing Sheets

AIR BAG CUSHION

BACKGROUND OF THE INVENTION

1. Field of the Invention

The present invention relates to an airbag cushion for protecting a passenger upon a vehicle collision.

2. Discussion of the Related Art

Recently, consumers think that the safety of a vehicle, as well as the performance or design of a vehicle, is a very important consideration in choosing a vehicle. Therefore, car manufacturers have established the development of technologies for securing the safety of a vehicle as a primary goal and are devoting themselves to this goal. Under the circumstance of the development of technologies, airbag cushions are receiving attention as means for improving the safety of a passenger, and the technologic development for these means are in rapid progress.

Such an airbag cushion serves to protect a passenger as it is deployed before the passenger hits an interior structure of a vehicle by an inertial force and the kinetic energy of the passenger is consumed by the elasticity of the airbag cushion. In order for the airbag cushion to be deployed before the collision of the passenger, the airbag cushion should be deployed at a high speed. However, the kinetic energy of the airbag cushion caused by high-speed deployment is considerable. Thus, if the passenger hits the airbag cushion during the deployment of passenger, the kinetic energy generated during the deployment of the airbag cushion is transferred to the passenger, thus causing a serious injury to the neck of the passenger. Due to this, the airbag cushion mounted for safety may instead pose a threat to the safety of the passenger.

Accordingly, this problem should be reflected in advance in designing the shape of the airbag cushion. On the other hand, however, the solving of this problem should be done based on economic efficiency, so there is a demand for the development of airbag cushions satisfying both economic efficiency and safety.

SUMMARY OF THE INVENTION

The present invention has been made in an effort to prevent a passenger from being injured by the kinetic energy generated during the deployment of an airbag cushion, and secures the economic efficiency of the manufacture of an airbag cushion.

To achieve the foregoing object, there is provided an airbag cushion according to the present invention, which is deployed by an incoming gas, forming a predetermined space, and forms a valley at the center region on which a passenger's face hits by allowing the inner faces forming the space to come in contact with each other upon deployment.

The airbag cushion may be formed by joining a front panel and a rear panel such that the airbag cushion is deployed while maintaining a predetermined space when gas is introduced, and the valley formed at the center region may be formed by joining parts of the front panel and rear panel together.

In the airbag cushion, a recessed portion may be formed on the lower end of the face the passenger hits upon deployment.

In the airbag cushion, both opposite ends may be supported by a tether such that both opposite ends may be folded to face each other and the deployment of both opposite ends may be restrained.

The present invention has the following effects.

First, the present invention provides an airbag cushion which can increase safety by preventing a passenger from being injured by the passenger's face being hit by the airbag cushion during the deployment of the airbag cushion in a vehicle collision.

Second, the present invention is economically efficient since safety can be increased only by joining without adding a particular component.

Third, the present invention is easily modulized since the safety can be maintained only by one airbag cushion.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
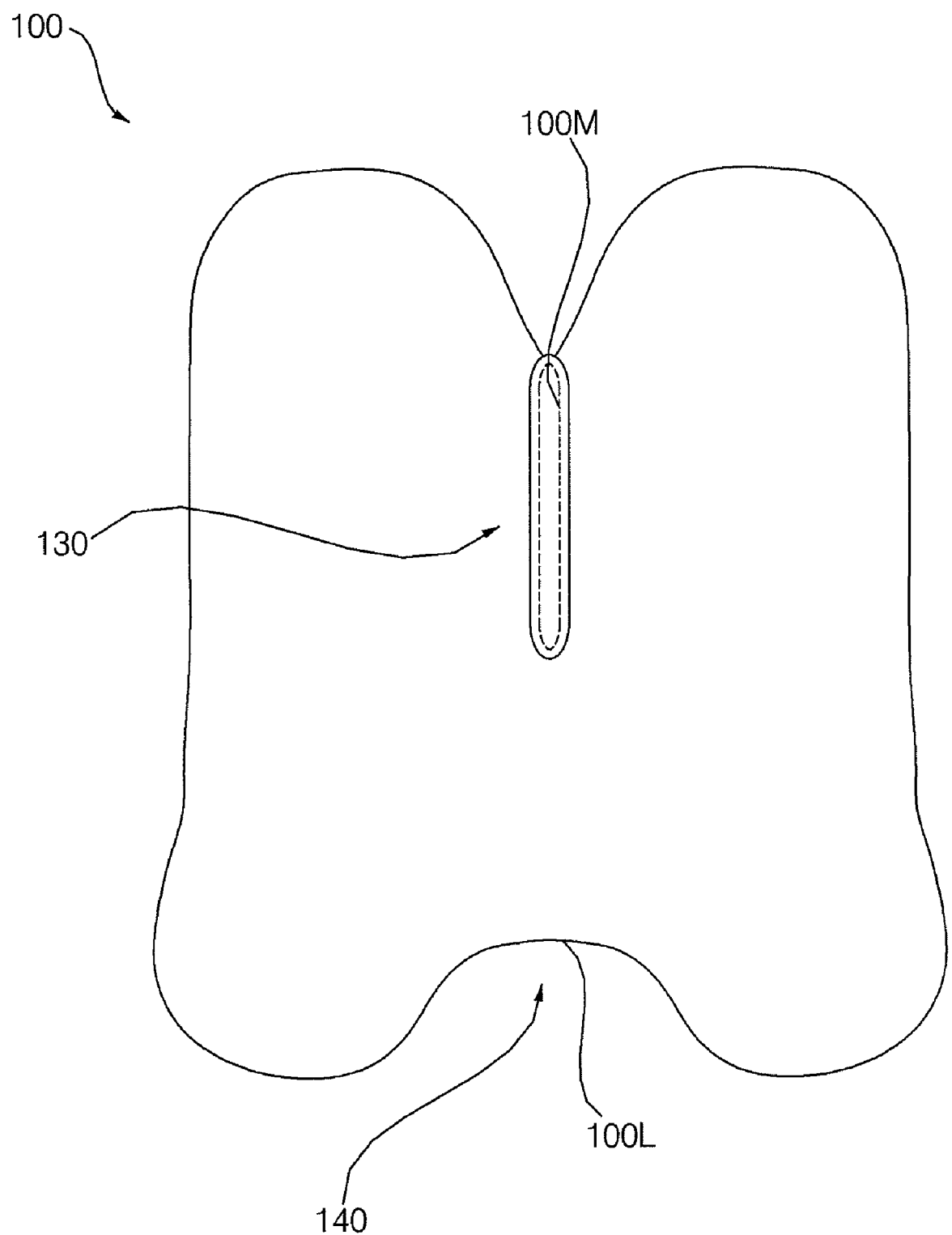
FIG. 1 is a front view showing the front face when an airbag cushion is deployed according to a first embodiment of the present invention.
Figure 2:
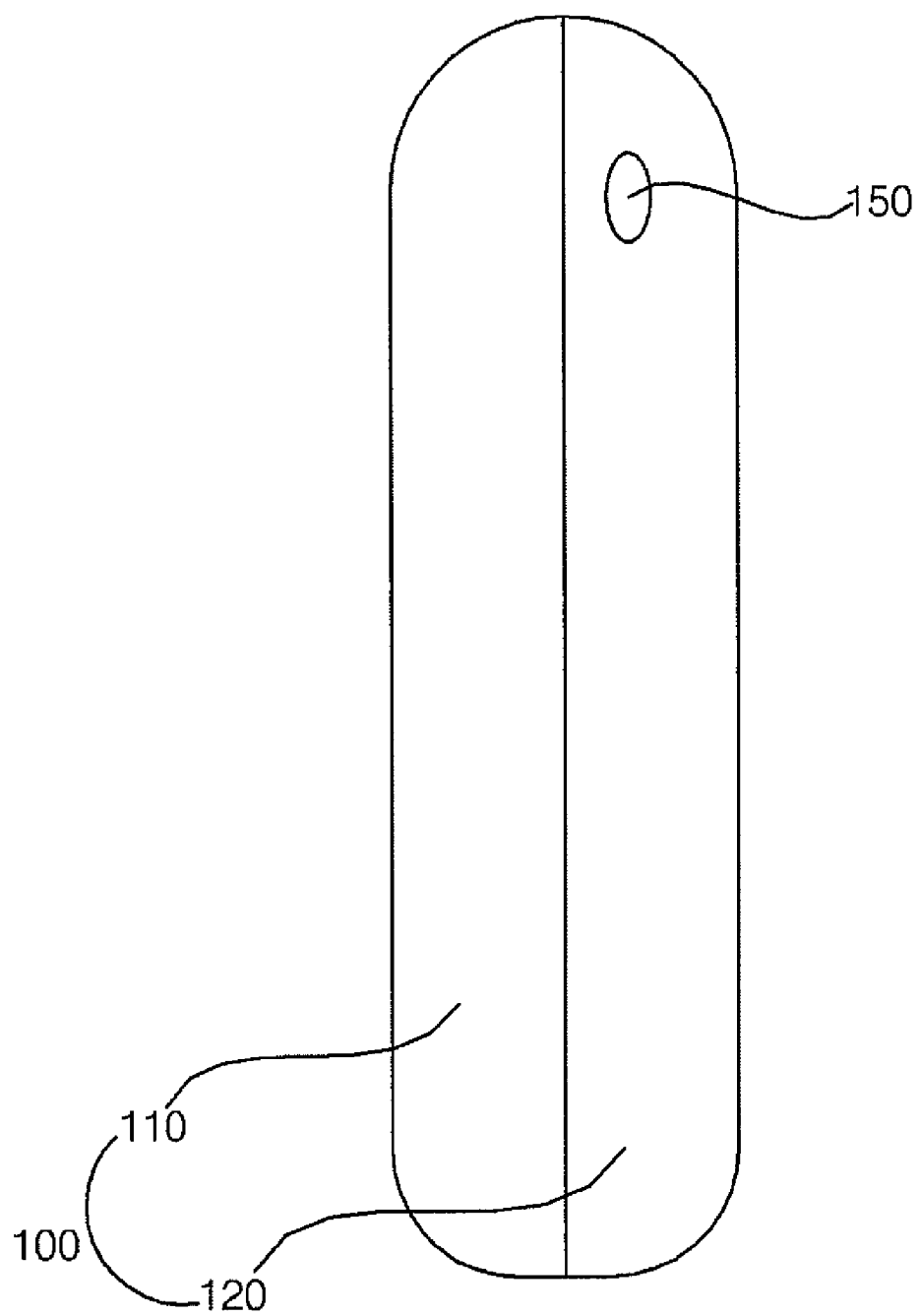
FIG. 2 is a side view showing the side face when the airbag cushion is deployed according to the first embodiment of the present invention.
Figure 3:
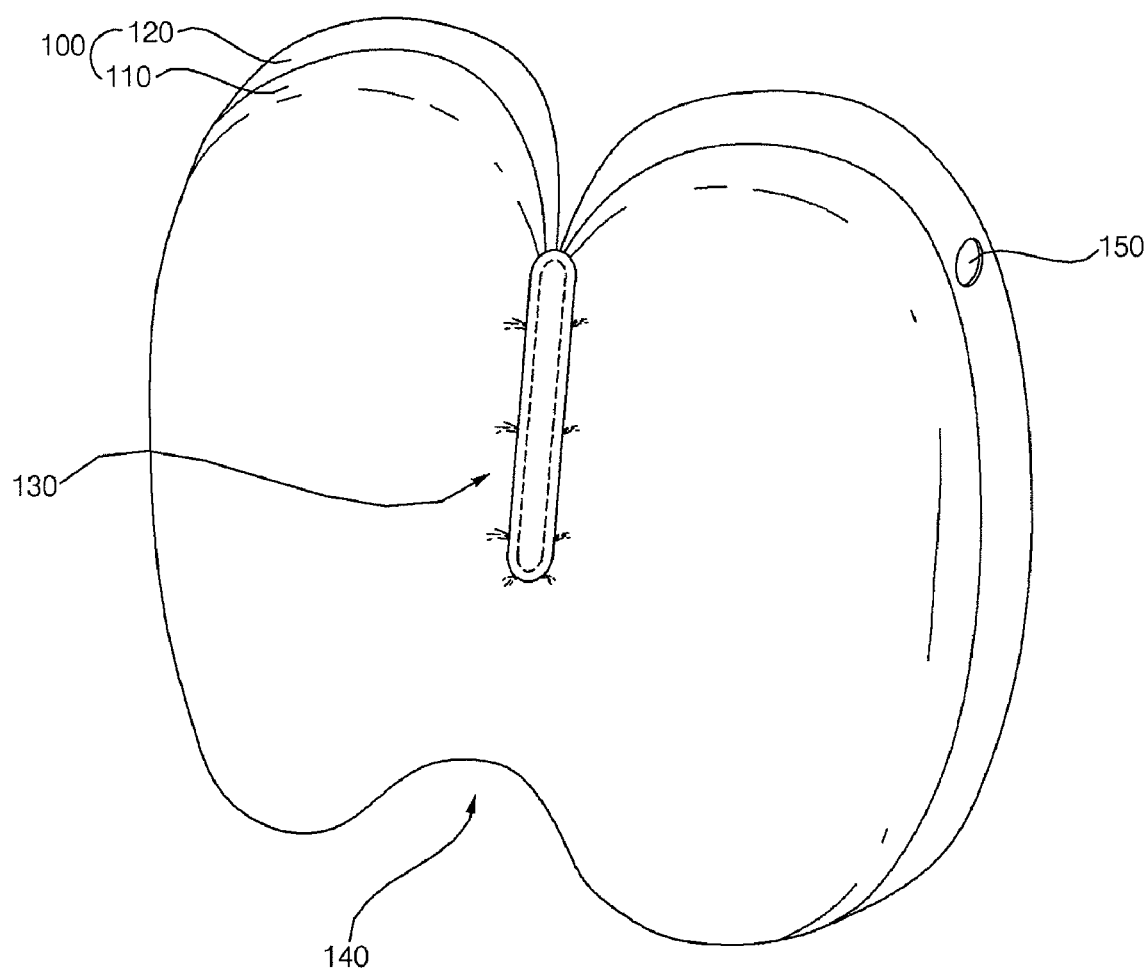
FIG. 3 is a side view showing the deployment of the airbag cushion according to the first embodiment of the present invention.

Hereinafter, a first embodiment of the present invention will be described with reference to FIGS. 1 to 3.

An airbag cushion 100 includes a front panel 110 and a rear panel 120 joined together to form a predetermined space. The front panel and the rear panel may be formed of a material having sufficient strength and flexibility because they are deployed by an incoming high-pressure gas.

The airbag cushion 100 is deployed by a gas introduced by the inflation of an inflator (not shown) in the event of a vehicle collision. Some parts of the front panel 110 and rear panel 120 are attached to each other so as to form a valley 130 at the center part 100M of the airbag cushion 100 a passenger's face hits when the passenger bounces forward by an inertial force caused by the vehicle collision. At this time, the attachment may be done with an adhesive, but, more preferably, they are joined by sewing in terms of securing sufficient strength. A recessed portion 140 is formed on the lower end portion 100L of the surface the passenger hits during the deployment of the airbag cushion 100. The recessed portion 140 may be formed easily by a method, like laser cutting, in the manufacture of the airbag cushion 100. The functions of the valley 130 and the recessed portion 140 will be discussed later.

Meanwhile, a vent hole 150 for discharging the gas introduced into the airbag cushion is formed on the rear panel 120 of the airbag cushion. Generally, since the airbag cushion 100 has to be deployed within a short time, gas is supplied from the inflator (not shown) that ejects a high-pressure gas. Because the amount of gas ejected by the inflation of the inflator cannot be easily controlled, a vent hole needs to be formed such that the gas may be introduced into the airbag cushion and the airbag cushion may be prevented from bursting due to the pressure of the introduced gas. By the way, the gas released through the vent hole has a high pressure, and this brings about the concern of causing an injury to the passenger. Hence, it is preferred to form the vent hole 150 on the rear panel 120.

The airbag cushion 100 may be configured for preventing a collision of a passenger in an assistant driver's seat. However, this invention is not limited to the assistant driver's seat because the valley 130 can remarkably reduce the risk of injury to the cervical vertebrae of the passenger in a driver seat as well.

Hereinafter, the function of the valley 130 and the recessed portion 140 will be described.

First, the functions of the valley 130 will be described. When a vehicle collides during traveling, with a passenger in the vehicle, the inflator (not shown) for supplying gas into the airbag cushion inflates. As the inflator inflates, a high-pressure gas is introduced into the airbag cushion 100, and accordingly the airbag cushion 100 is deployed at a high speed. However, if the passenger collides with the airbag cushion during the deployment of the airbag cushion, a kinetic energy generated from the high-pressure gas is transferred to the passenger as it is. Although, of course, a certain degree of kinetic energy can be reduced because the material of the front panel 110 and rear panel 120 constituting the outer wall of the airbag cushion has some elasticity and the volume of the gas itself is reduced by an external pressure, the reduction is very small compared with the kinetic energy transferred to the passenger. Due to this, when the airbag cushion collides with the passenger's face during deployment, a high impact force is exerted on the passenger, thus causing a serious injury to the cervical vertebrae of the passenger.

Thereupon, in order to prevent the airbag cushion from exerting an impact to the passenger during deployment, a method of lacing a tether in a region of the airbag cushion with which the passenger collides, and delaying the deployment time of the airbag cushion in this region may be used. However, the tether has the problem that it cannot secure the reliable safety of the airbag cushion since the level of delay of the deployment time is varied for each collision. Besides, there is another problem that, in order to attach a tether to the airbag cushion, a separate process is required in the manufacture of the airbag cushion to thus increase the labor time, and a particular part, i.e., a tether, is required to thus increase the manufacturing costs.

However, due to the presence of the valley 130 that is employed in this embodiment, the following positive effects can be achieved.

First, even if the airbag cushion is deployed, the volume of deployment of the airbag cushion to the passenger's face is small because the valley 130 is formed in the region which the passenger's face hits, thereby reducing the impact force exerted on the passenger's face. Due to this, even if the airbag cushion is deployed, the risk of injury to the cervical vertebrae of the passenger decreases. In the meantime, the deployment of the airbag cushion leads to the formation of a volume of more than a predetermined level in the regions around the valley 130. Thus, an increase of the collision time can also achieve the effect of reduction of an impact force to a sufficient extent, thereby making it possible to maintain the primary function of the airbag cushion.

Second, the front panel 110 and the rear panel 120 are sewn together in the region where the valley 130 is formed, thereby making it easier to form the valley 130. Thus, the working efficiency is increased compared with the use of a tether.

Third, since the valley 130 is easily formed only by sewing the front panel 110 and the rear panel 120 together without any particular member.

Meanwhile, the recessed portion 140 formed on the airbag cushion 100 of this embodiment performs the following functions. When the airbag cushion is deployed, with a passenger sitting in a seat of the vehicle, the waist and leg sides of the passenger are put into the recessed portion 140. At this time, as the recessed portion 140 has such a shape as to be smoothly inwardly curved, the surface area of the face of the recessed portion contacting the passenger increases. Accordingly, when the airbag cushion 100 is deployed, the impact force applied to the passenger by the deployment force is dispersed by the shape of the recessed portion and decreases. Besides, in a case where the airbag cushion is deployed by a vehicle collision, with the passenger seated in the seat leaning downward, lifting the waist, the presence of the recessed portion 140 performs the same function as the valley 130, thereby preventing damage to the cervical vertebrae of the passenger.

Hereinafter, an airbag cushion 200 according to a second embodiment of the present invention of the present invention will be described with reference to FIGS. 4 to 8.

The construction and operation of the airbag cushion 200 according to the present invention are identical to those of the first embodiment of the present invention except that the airbag cushion is deployed, with both opposite ends of the airbag cushion folded to face each other. Thus, a repeated description of the airbag cushion 100 according to the first embodiment of the present invention will be omitted.

The airbag cushion 200 performs the function of protecting a passenger by being deployed in a vehicle collision and consuming a kinetic energy generated by the inertial force of the passenger. At this time, in order to consume the kinetic energy of the passenger enough to protect the passenger, the volume of the airbag cushion 200 has to be more than a predetermined level. For this, in this embodiment, both opposite ends 280 are supported by a tether 290 (see FIG. 8) so that the airbag cushion 200 may be deployed in a folded state.

Figure 4:
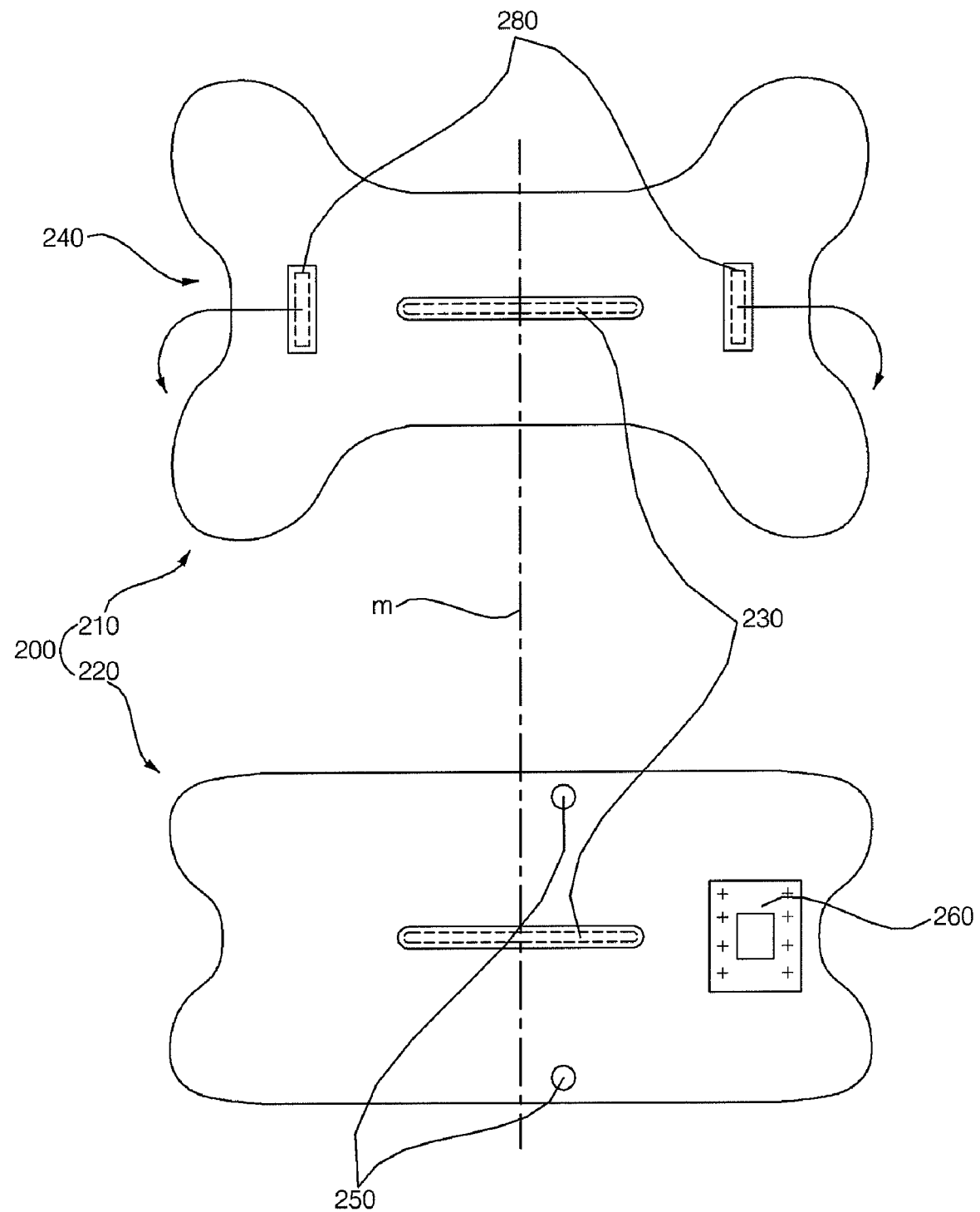
FIG. 4 is a plane view showing a front panel and a rear panel, respectively, of an airbag cushion according to a second embodiment of the present invention.

Hereinafter, the front panel 210 and rear panel 220 of the airbag cushion will be described with reference to FIG. 4. FIG. 4 shows a plane view of the front panel 210 and the rear panel 220. The outer lines of the front panel 210 are cut so as to form a recessed portion 240 by a method like laser cutting (as merely an illustrative technique). Seams are formed at the center for forming a valley 230. Further, attachment portions 280 for attaching a tether 290 are formed at the front panel 210 so that the airbag cushion may be folded to have a sufficient volume during deployment. The airbag cushion 210 is folded at the center line m so that the attachment portions may be supported by the tether 290 and face each other.

On the rear panel 220 as well, seams for forming the valley 230 are formed, and a hole for a vent hole 230 is formed. Further, a retainer attaching portion 260 that is contacted with a retainer (not shown) for joining to an inflator and supporting the airbag cushion is formed so that gas generated from the inflator (not shown) may be introduced.

The shape of the airbag cushion upon deployment will be described with reference to FIGS. 5 to 8.

Figure 5:
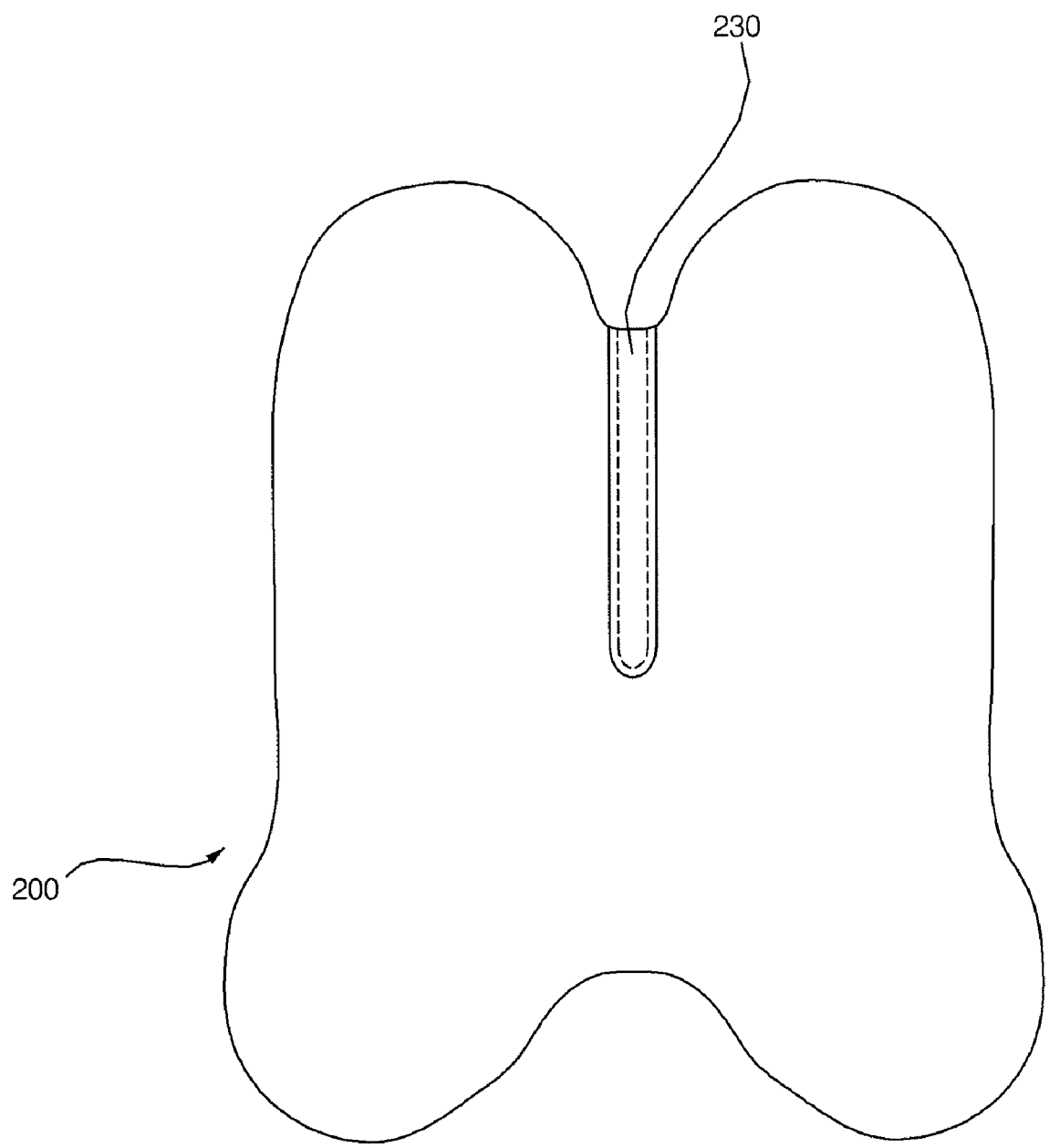
FIG. 5 is a front view showing the front face when the airbag cushion is deployed according to the second embodiment of the present invention.
Figure 6:
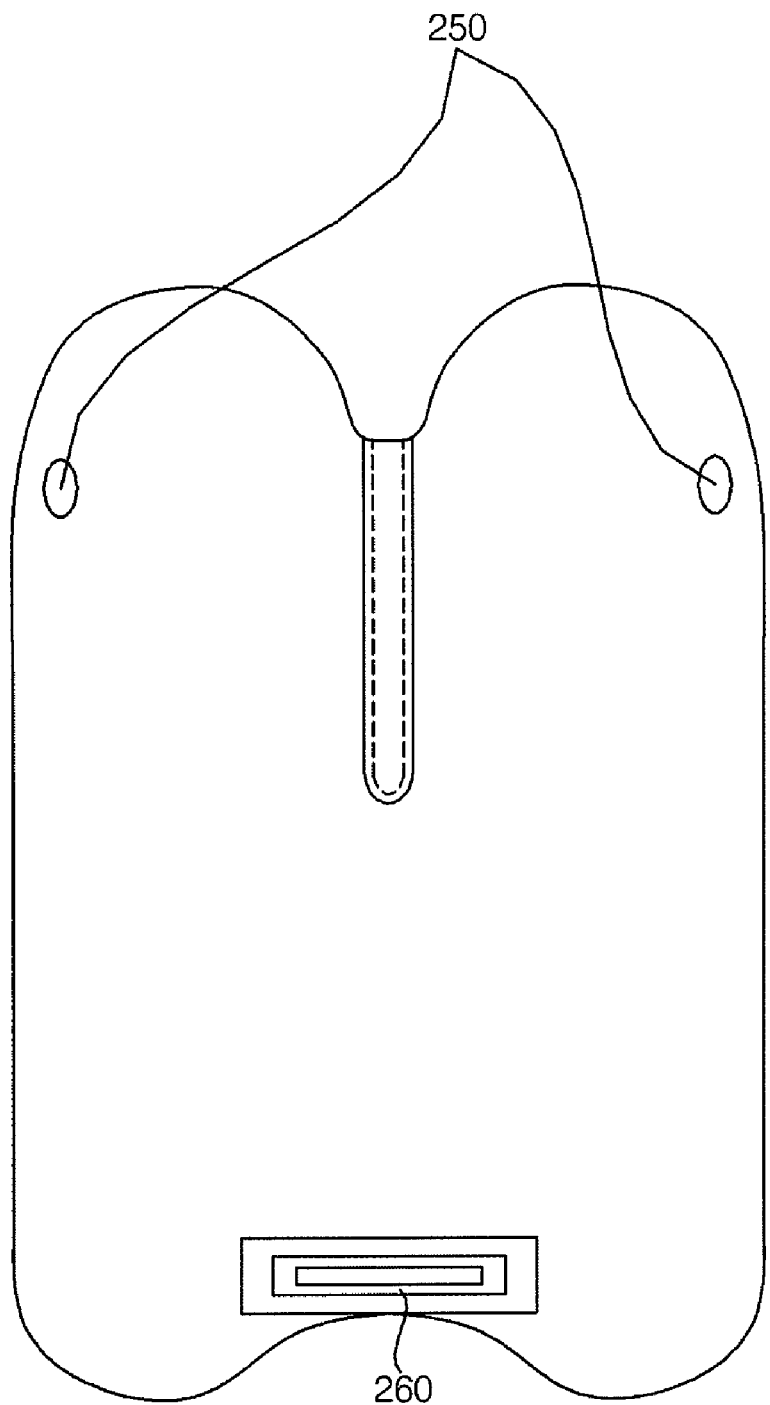
FIG. 6 is a rear view showing the rear face when the airbag cushion is deployed according to the second embodiment of the present invention.
Figure 7:
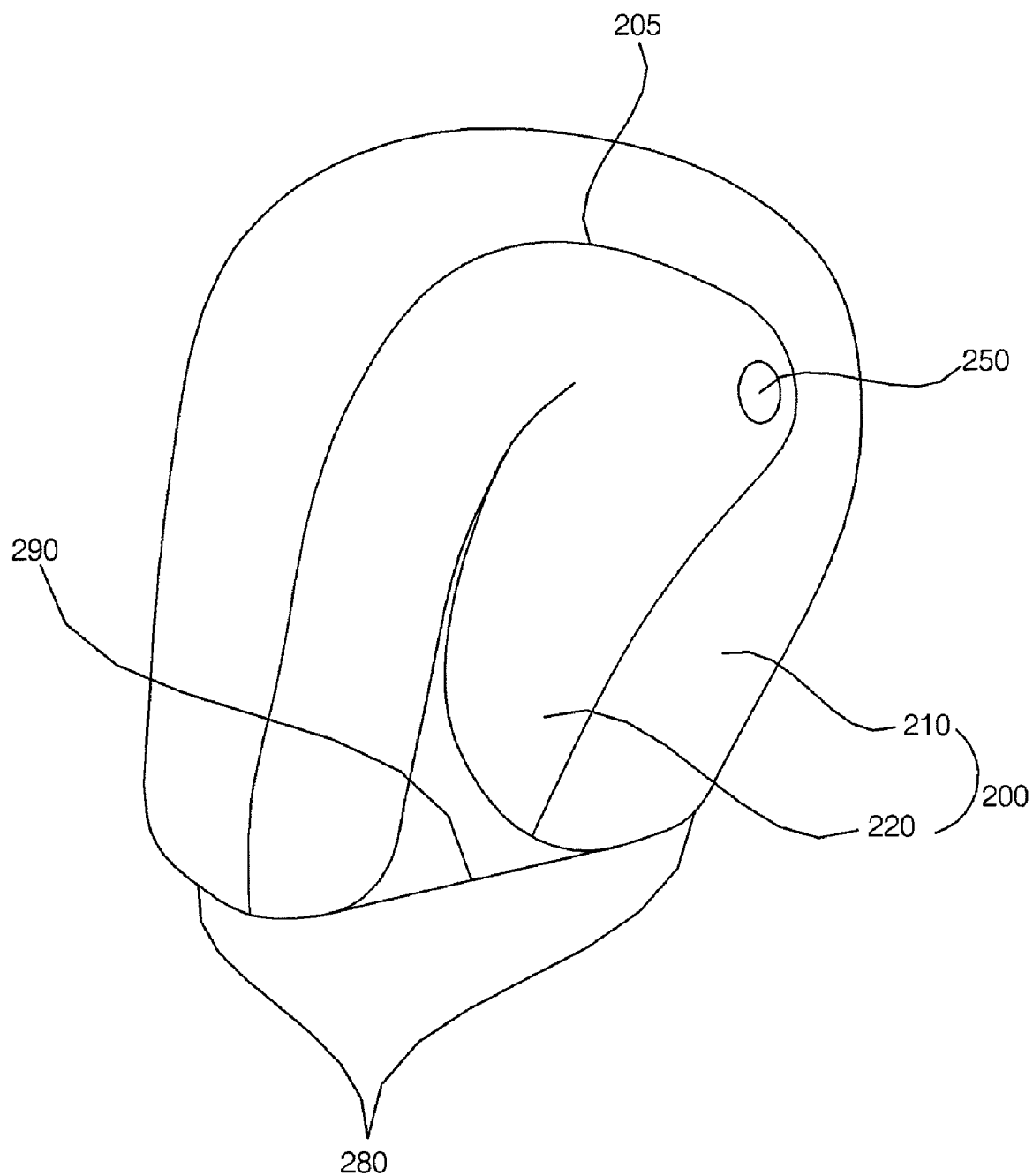
FIG. 7 is a side view showing the side face when the airbag cushion is deployed according to the second embodiment of the present invention.
Figure 8:
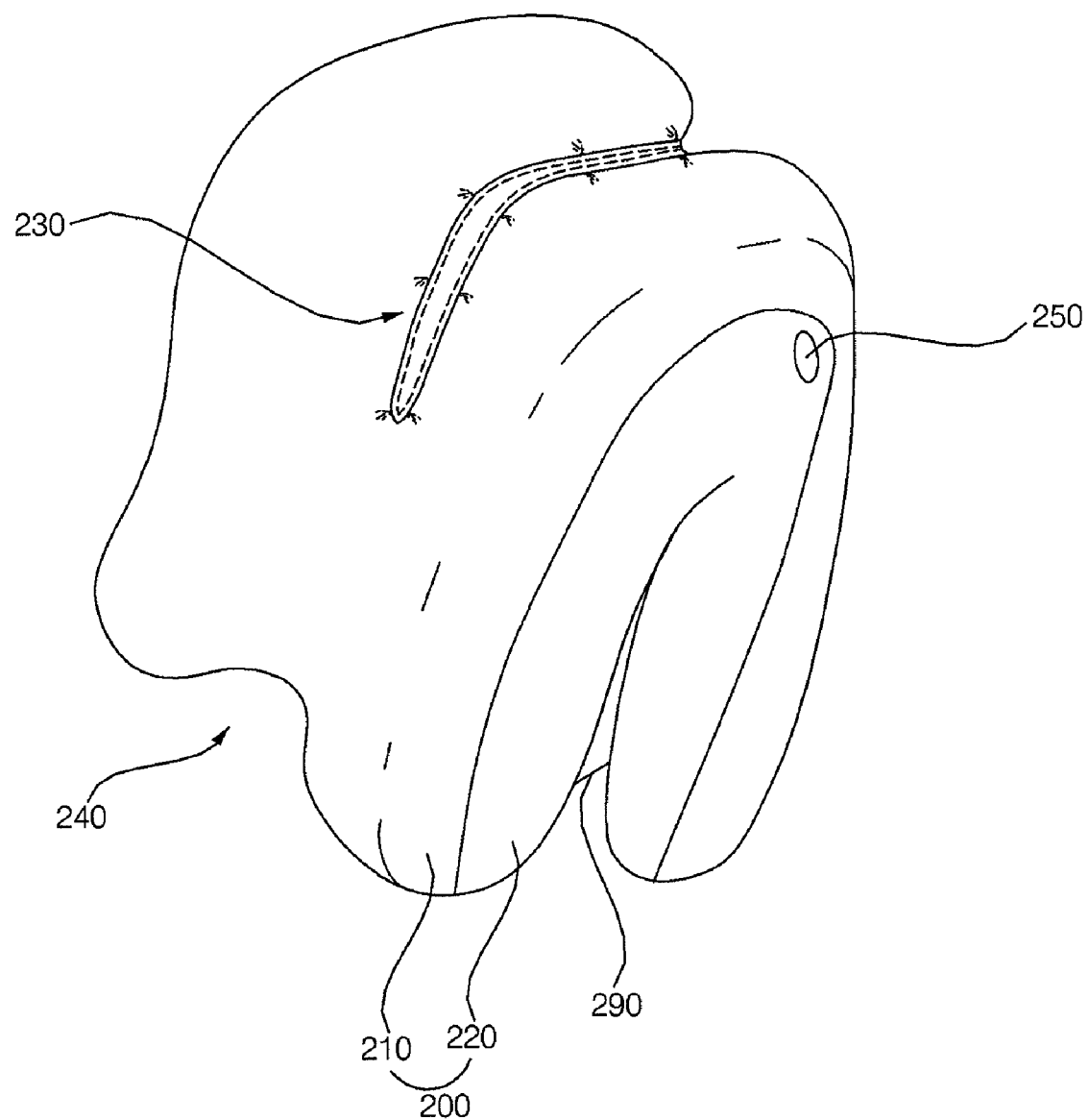
FIG. 8 is a perspective view showing the deployment of the airbag cushion according to the second embodiment of the present invention.

FIG. 5 is a front view showing the front face the passenger hits when the airbag cushion 200 is deployed. FIG. 6 is a rear view showing the rear face the passenger hits when the airbag cushion 200 is deployed. FIG. 7 is a side view showing the side face the passenger hits when the airbag cushion 200 is deployed. FIG. 8 is a perspective view of the airbag cushion 200 when the airbag cushion 200 is deployed.

Although gas is introduced along the space formed by the front panel 210 and the rear panel 220 when the airbag cushion 200 is deployed, the airbag cushion in a folded state is prevented from being unfolded by the tether 290, and accordingly the volume of the airbag cushion 200 becomes twice larger with respect to the direction in which the passenger hits the airbag cushion, thereby increasing the time taken to consume energy upon collision as much. Due to this, the impact force applied to the passenger decreases, and resultantly the safety of the passenger can be further promoted. In the meantime, the valley 230 is formed to reduce the volume in the region the passenger's face hits, so that the airbag is kept from being deployed in the valley 230 region, thereby preventing the airbag cushion from causing injury to the cervical vertebrae of the passenger as it hits the passenger's face upon deployment.

As described above, the present invention has been described with reference to the embodiment shown in the drawings, but it is just for illustration only and those skilled in the art will understand that there are various modifications and equivalent other embodiments therefrom. Accordingly, the sincere technical scope of the invention should be defined based on the technical spirit of the appended claims.

The present invention can be used in the technology of development of an airbag cushion that secures the safety of a passenger in a vehicle collision.

What is claimed is:

1. An airbag cushion, comprising:

a front panel and a rear panel joined to each other to form a predetermined space between the front panel and the rear panel; and a valley at a central region of the front panel configured to confront a passenger's face when the airbag cushion is deployed, wherein an inner side of the central region of the front panel and an inner side of a central region of the rear panel are attached to each other to form the valley, the valley having a reduced thickness in comparison to the portions of the airbag cushion surrounding the valley.

2. The airbag cushion of claim 1, wherein the valley is formed by sewing central regions of the front panel and the rear panel.

3. The airbag cushion of claim 1, wherein a recessed portion is formed on the lower end of the face the passenger hits upon deployment.

4. The airbag cushion of claim 1, wherein a tether connects opposite ends of the airbag cushion such that the opposite ends of the airbag cushion are folded to face each other and the deployment of the opposite ends of the airbag cushion are restrained.

5. The airbag cushion of claim 4, wherein a vent hole for discharging an introduced gas is formed at the rear side with respect to the folded portion.

\* \* \* \* \*